US010618500B2

(12) United States Patent
Poton et al.

(10) Patent No.: US 10,618,500 B2
(45) Date of Patent: Apr. 14, 2020

(54) COVER EQUIPPING A CONNECTOR FOR A MOTOR VEHICLE WIPER

(71) Applicant: Valeo Systèmes d'Essuyage, Le Mesnil Saint Denis (FR)

(72) Inventors: Eric Poton, Pont du Chateau (FR); Vincent Gaucher, Ennezat (FR); Stéphane Houssat, Blanzat (FR)

(73) Assignee: Vale Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/351,506

(22) Filed: Nov. 15, 2016

(65) Prior Publication Data
US 2017/0136995 A1 May 18, 2017

(30) Foreign Application Priority Data
Nov. 17, 2015 (FR) ...................... 15 61073

(51) Int. Cl.
*B60S 1/38* (2006.01)
*B60S 1/40* (2006.01)
*B60S 1/34* (2006.01)

(52) U.S. Cl.
CPC .......... *B60S 1/3851* (2013.01); *B60S 1/3443* (2013.01); *B60S 1/3849* (2013.01); *B60S 1/40* (2013.01); *B60S 1/4041* (2013.01); *B60S 1/4074* (2013.01); *B60S 2001/3898* (2013.01); *B60S 2001/4061* (2013.01)

(58) Field of Classification Search
CPC .......... B60S 1/40; B60S 1/407; B60S 1/4074; B60S 1/4077; B60S 1/4041; B60S 2001/4061; B60S 2001/4058; B60S 1/3849

USPC ....................................... 15/250.32
See application file for complete search history.

(56) References Cited

U.S. PATENT DOCUMENTS 3,641,614 A * 2/1972 Newsome ................ B60S 1/40
15/250.32
4,114,227 A * 9/1978 Blackman ............. B60S 1/4038
15/250.32

(Continued)

FOREIGN PATENT DOCUMENTS

CN 101883701 A 11/2010
CN 104228775 A 12/2014
(Continued)

OTHER PUBLICATIONS

Machine translation of description portion of EP 0012847, published Nov. 1979.*

(Continued)

*Primary Examiner* — Gary K. Graham
(74) *Attorney, Agent, or Firm* — Osha Liang LLP

(57) ABSTRACT

The invention relates to a cover 20 intended to lock a shaft 2a securely to a driving arm and a connector 8 that carries a wiper 1, the cover 20 extending along a main longitudinal axis X and having at least two longitudinal flanks 25, each longitudinal flank 25 having an open slot 29 delimited at a first longitudinal end by an end wall 29e and at a second longitudinal end by an opening 29c for receiving the shaft 2a, said cover 20 being characterized in that said opening 29c is formed opposite said end wall 29e.
Application to motor vehicles, in particular to the wiping of a rear window.

12 Claims, 2 Drawing Sheets

(56) References Cited

U.S. PATENT DOCUMENTS

Figure 1:
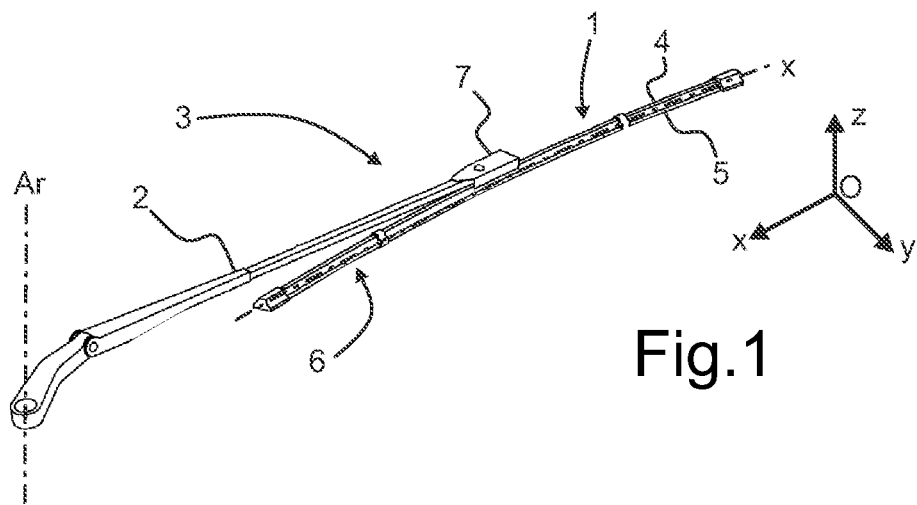

| | | | | |
|---|---|---|---|---|
| 4,118,825 | A | * | 10/1978 | Hoebrechts ........... B60S 1/4003 15/250.32 |
| 4,343,064 | A | * | 8/1982 | van den Berg ....... B60S 1/4038 15/250.32 |
| 7,921,503 | B1 | * | 4/2011 | Chiang ..................... B60S 1/40 15/250.32 |
| 2014/0047662 | A1 | * | 2/2014 | Depondt ............... B60S 1/3863 15/250.32 |

FOREIGN PATENT DOCUMENTS

| | | | |
|---|---|---|---|
| CN | 204264105 U | | 4/2015 |
| CN | 204674547 U | | 9/2015 |
| DE | 20122773 U1 | | 8/2007 |
| EP | 0012847 | * | 11/1979 |
| EP | 0053960 | * | 6/1982 |
| EP | 0566443 | * | 10/1993 |
| EP | 2229301 A1 | | 9/2010 |
| JP | 49-30662 | * | 8/1974 |
| JP | 2011256932 A | | 12/2011 |
| WO | 02-34590 | * | 5/2002 |
| WO | 0234590 A1 | | 5/2002 |
| WO | 2009071372 A1 | | 6/2009 |

OTHER PUBLICATIONS

Machine translation of description portion of WO 2009071372, published Jun. 2009.*

Machine translation of description portion of EP 0566443, published Oct. 1993.*

Preliminary Report Issued in Corresponding French Application No. 1561073, dated Aug. 11, 2016 (7 Pages).

The First Office Action of corresponding Chinese Application No. 201611013566.3, dated Sep. 3, 2018 (12 pages).

* cited by examiner

COVER EQUIPPING A CONNECTOR FOR A MOTOR VEHICLE WIPER

The present invention concerns wiping systems for motor vehicles, and relates more particularly to a joining device used to connect a wiper to a driving arm for driving the latter.

Wiping systems, commonly known as windscreen wipers, for motor vehicles are designed to remove liquids and dirt which can disrupt the driver's view of his surroundings, by wiping. These windscreen wipers generally comprise a driving arm which carries out an angular back-and-forth movement about a rotation axis, and an elongate wiper equipped with a squeegee blade made of a resilient material. By rubbing against a, front or rear, glazed surface of the motor vehicle, the squeegee blade wipes the water and some of the dirt therefrom, and evacuates them from the driver's field of view.

Regardless of the configuration of the wiper, that is to say either a wiper having articulated brackets which retain the squeegee blade in several distinct zones, or a wiper having a metal blade which holds the squeegee blade along its entire length, the wiper is attached to the driving arm by a joining device which comprises at least one connector secured to the wiper.

In a first known manner of connecting, an adapter, which is able to be joined to the connector of the wiper, is fitted on an end piece of the driving arm. This first manner of connecting is commonly used for windscreen wipers intended for glazed surfaces situated at the front of the motor vehicle (windscreen). In a second known manner of connecting, the connector is attached to a shaft secured to the driving arm. This second manner of connecting is commonly encountered in windscreen wipers intended for glazed surfaces situated at the rear of the vehicle (rear window).

The closest prior art is formed by the document EP2229301 B1, which describes a windscreen wiper comprising a cover which is intended to be attached to the connector that carries the wiper. The assembly formed by the cover and the connector is designed to receive the shaft of the driving arm in an open position of the cover. Next, the cover is moved in translation between the open position and a closed position.

To this end, the cover comprises a slot for receiving the shaft and for allowing the cover to move in translation. The slot is in the shape of an elbow having a first part for introducing the shaft into the slot and a second part for allowing the cover to move in translation on the shaft and the connector, the first part being formed orthogonally to the second part.

The general problem arises of joining the connector, the shaft and the cover together in a manner which should be ergonomic, rapid, robust, effective and durable, this not being the case for the cover described in the document EP2229301 B1. Specifically, it is necessary to preassemble the cover on the connector before introducing the shaft into the slot. Such a preassembly operation involves handling measures which, for reasons of ergonomics and ease of use, should be avoided.

One particular problem resides notably in the elbow shape of the slot, which has drawbacks for fitting the shaft in the latter.

The aim of the present invention is to improve this situation by proposing a cover, the fitting of which on a shaft of a driving arm is rapid, a mechanical connection between the cover and/or the driving arm and/or a connector being easy to implement, robust, effective and durable.

To this end, the subject of the invention is a cover intended to lock a shaft securely to a driving arm and a connector that carries a wiper, the cover extending along a main longitudinal axis and having at least two longitudinal flanks, each longitudinal flank having an open slot delimited at a first longitudinal end by an end wall and at a second longitudinal end by an opening for receiving the shaft.

According to the present invention, said opening is formed opposite said end wall. In other words, the open slot is rectilinear at least between an end wall and an opening delimiting the open slot. It will be noted that the rectilinear direction which the open slot follows extends along a longitudinal axis of the cover. This avoids the elbow shape of the prior art slot and it is thus easier to fit the cover on the arm.

The cover has at least any one of the following features, on their own or in combination:
- the periphery of each open slot has a substantially "U"-shaped overall shape,
- the open slot comprises a first portion which is in the shape of a parallelogram and a second portion which is in the shape of a semicircle, these two portions being immediately contiguous,
- the first portion has an opening which is formed through a vertical edge of the longitudinal flank, the shaft being able to be introduced into the open slot through said opening when the cover is attached to the wiping system,
- the cover comprises a shroud delimiting an internal volume which accommodates the longitudinal flanks,
- the shroud comprises a top bordered at least by two lateral flanges,
- the cover delimits a space between a lateral flange and a longitudinal flank, the space being intended to receive at least a part of the driving arm, notably after the shroud has been locked to the connector,
- the top extends along a plane generally perpendicular to the plane in which at least one longitudinal flank extends,
- the cover comprises a transverse wall which extends between the lateral flanges and which is provided with a tab, the latter being intended to lock the cover to the connector,
- the transverse wall forms an end wall of the cover which delimits the internal volume,
- the tab is provided with a transverse lip which protrudes from the tab. Such a lip forms for example a coupling tooth which extends into the internal volume of the cover,
- the cover is equipped with means for fastening the cover to a device formed by the shaft and the connector, the fastening means comprising the open slot for receiving the shaft and a transverse lip for engaging it with a rib on the connector.

The invention also relates to an assembly formed by the connector provided with at least one receiving bearing for receiving a shaft, by the shaft equipping a driving arm, and by such a cover.

The invention also relates to a wiper equipped with a cover as described in the present document.

The invention also relates to a wiping system comprising a driving arm provided with a shaft and such a wiper.

The invention also relates to a method for joining together such an assembly, where:

a first step consists in joining the connector and the shaft of the driving arm together, by fitting the shaft into at least one receiving bearing, and for example a notch for guiding the connector, a second step consists in positioning the shaft inside the open slot by way of a movement in translation, a third step consists in moving the cover in translation with respect to the connector, until a transverse lip of the cover is engaged over a rib of the connector so as to secure the assembly.

These arrangements make it easier to fit the wiper on the driving arm. Since this connection is locked by way of an attached cover, the latter does not impede the introduction of the shaft into the bearing(s) of the connector. The mechanical connection between the cover and/or the driving arm and/or a connector is also more robust, effective and durable.

Figure 2:
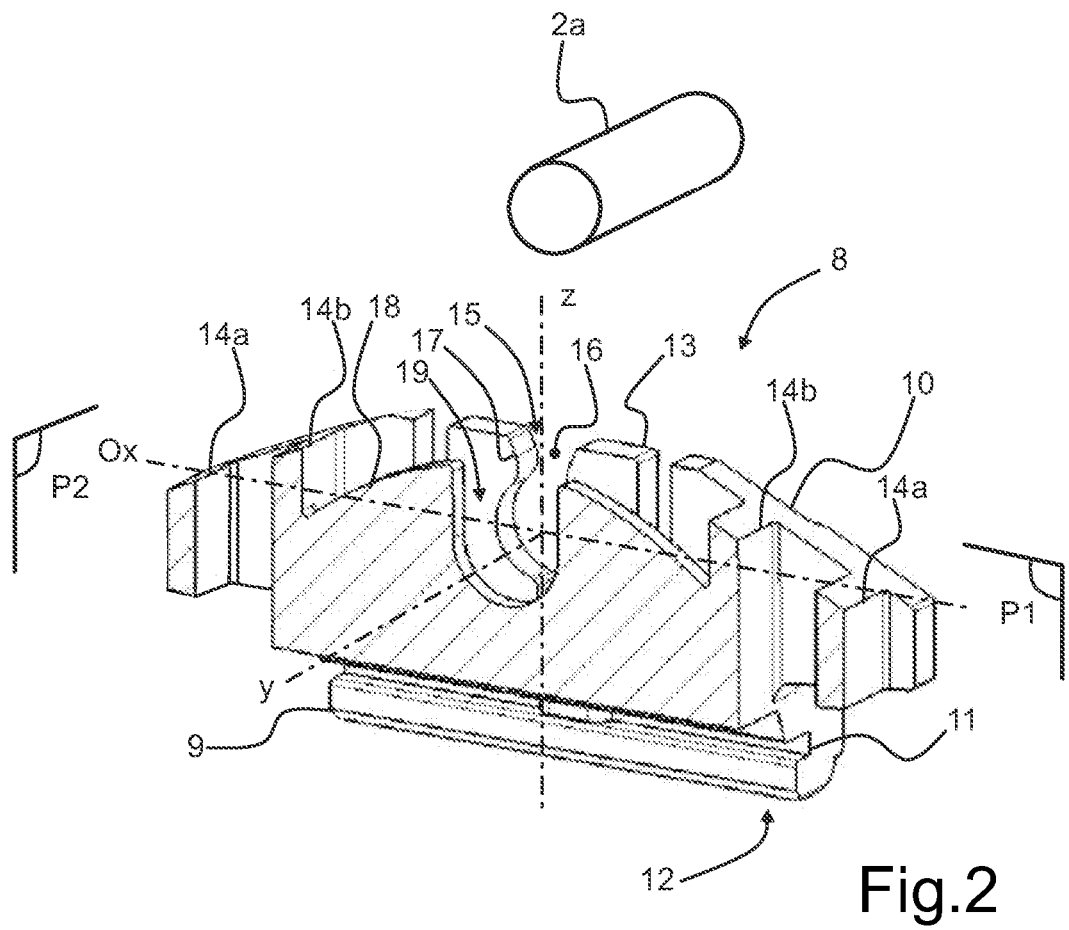
Figure 3:
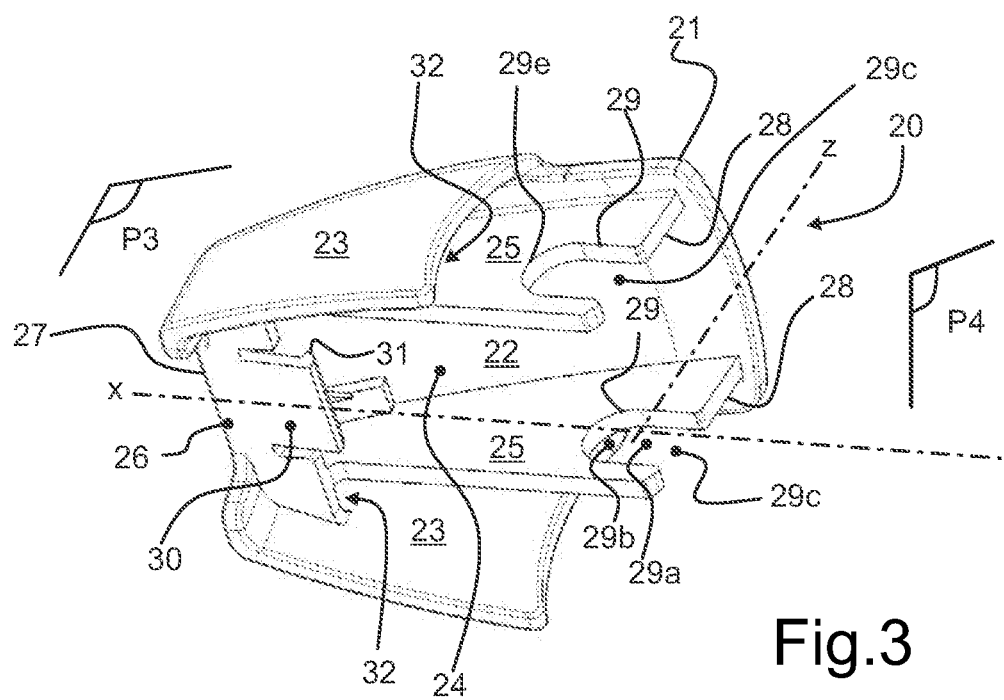
Figure 4:
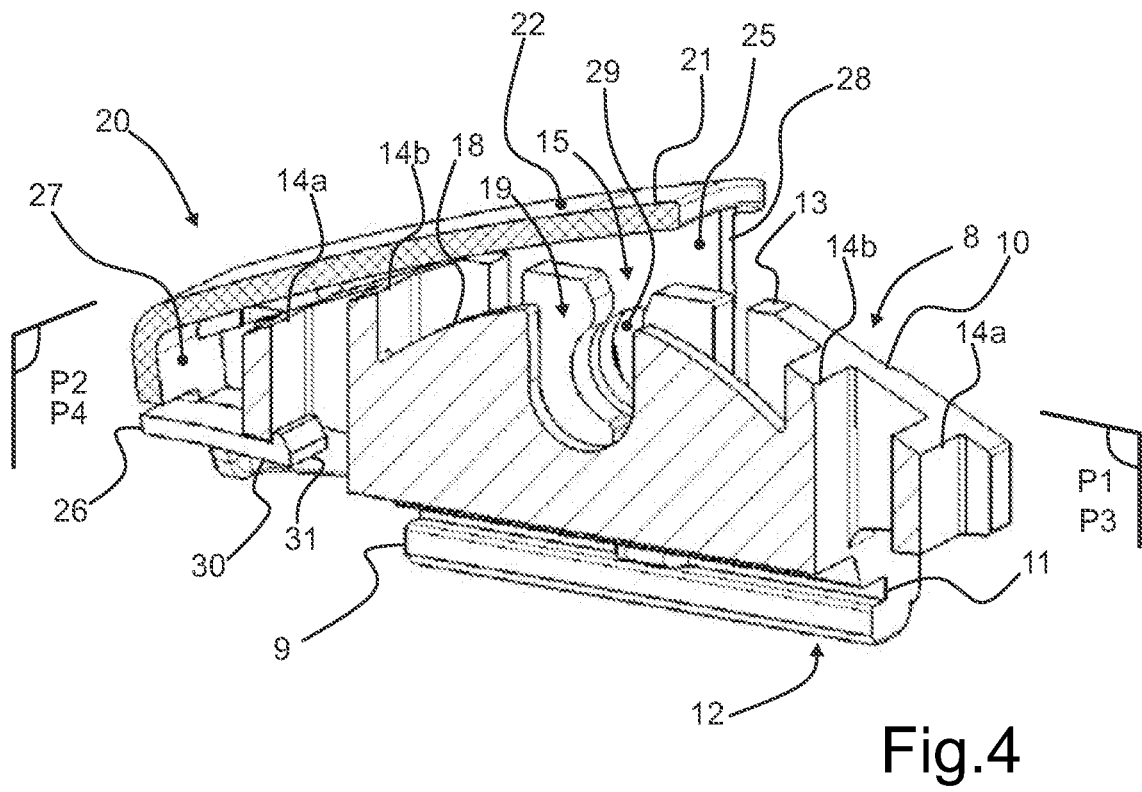

Further features, details and advantages of the invention will become more clearly apparent from reading the description given below by way of illustration and with reference to the following figures, in which:

FIG. 1 is a schematic perspective view of a wiping system according to the invention, FIG. 2 is a perspective view in median and longitudinal section of a connector according to the invention which is part of the wiping system illustrated in FIG. 1, FIG. 3 is a perspective view of a cover according to the invention which is part of the wiping system illustrated in FIG. 1, FIG. 4 is a perspective view in median and longitudinal section of the cover illustrated in FIG. 3 joined to the connector illustrated in FIG. 2.

It should first of all be noted that the figures explain the invention in detail for implementing it, and that these figures can also serve to better define the invention if necessary.

In the figures, the denominations longitudinal, lateral, transverse, vertical, above, below refer to the orientation of a wiper 1 illustrated in FIG. 1. A longitudinal direction corresponds to the main axis of the wiper 1 along which the latter extends. This main axis is parallel to a longitudinal axis X along which the cover 20 that is the subject of the invention extends. A transverse direction corresponds to that of a transverse axis Y which is perpendicular to the longitudinal axis X of the cover 20 and perpendicular to a rotation axis $A_r$ of a constituent driving arm 2 of a wiping system 3. A vertical direction, parallel to that of a vertical axis Z, and the denominations upper or lower relate to orientations parallel to the rotation axis $A_r$ of the driving arm 2 of the wiping system 3, the denomination lower containing the plane of the windscreen.

The directions mentioned above are illustrated in an orthonormal frame of reference Oxyz shown in the figures. In this frame of reference, the axis Ox represents the longitudinal direction, the axis Oy represents the transverse direction, and the axis Oz represents the vertical direction.

In FIG. 1, a motor vehicle is commonly equipped with the wiping system 3 for evacuating water and/or dirt present on a glazed surface, notably a rear window of the motor vehicle. The wiping system 3 comprises a driving arm 2 which is able to carry out an angular back-and-forth movement along and over the glazed surface. The glazed surface is either a front windscreen or a rear window with which the motor vehicle is equipped.

The wiping system 3 also comprises a wiper 1 which extends along a main axis, known as the longitudinal axis parallel to the axis Ox. The wiper 1 comprises at least one air deflector 4 and a squeegee blade 5. The air deflector 4 is provided to convert a pressure applied by an airflow flowing along the glazed surface into a pressing force pressing the wiper 1 against the glazed surface of the motor vehicle. The squeegee blade 5 is the piece of the wiper 1 that is in direct contact with the glazed surface to evacuate the water and/or dirt present thereon. The air deflector 4 and the squeegee blade 5 form a semi-rigid assembly 6 which is carried by a connecting device 7 interposed between the driving arm 2 and the semi-rigid assembly 6.

The connecting device 7 provides a mechanical connection between the driving arm 2 and the wiper 1 and thus makes it possible to separate the wiper 1 from the driving arm 2 in order to replace the wiper 1.

Referring now to FIG. 2, the connecting device 7 comprises for example a connector 8 shown in a median longitudinal section along the longitudinal axis Ox of the wiper. The connector 8 comprises a base 9 which extends in the longitudinal and transverse directions, and a body 10 which extends, above the base 9, substantially in the vertical direction. According to the preferred embodiment shown in the figures, the connector 8, taken as a whole, has a first, longitudinal and vertical, plane of symmetry $P_1$ parallel to the plane Oxy of the orthonormal frame of reference defined above, and substantially medial in the transverse direction. According to a preferred embodiment of the invention, the connector 8 is produced by moulding a polymer material, for example a material from the polyoxymethylene family, known under the acronym POM, or by moulding a mixture of polymer materials, for example a mixture of polymers from the polycarbonate family and the acrylonitrile butadiene styrene family, known under the acronym ABS. Further materials that are known to a person skilled in the art, such as PBT 30GF, may also be used.

The base 9 comprises means for securing the connector 8 to the wiper 1. These securing means take the form of a first and a second groove 11 that are formed in the lower lateral parts of the base 9, each delimiting, in the lower lateral part of this base 9, a hook 12 that is able to engage with the wiper 1. Only one groove 11 is shown in FIG. 2, the second groove being formed in the symmetrical part of the base 9 with respect to the first, longitudinal vertical, plane of symmetry $P_1$ of the connector 8.

The body 10, which is advantageously made as one with the base 9, extends above the latter in the vertical direction. The body 10 has a dimension in the transverse direction that is substantially less than the transverse dimension of the base 9, and a longitudinal dimension substantially equal to or greater than the longitudinal dimension of the base 9. According to the embodiment of the invention that is illustrated in the figures, the longitudinal dimension of the body 10 is greater than that of the base 9, and the connector 8 has a second, transverse and vertical, plane of symmetry $P_2$ parallel to the plane Oyz of the orthonormal frame of reference defined above and substantially medial along the longitudinal axis Ox.

The body 10 has substantially vertical first and second lateral flanks 13 that are disposed symmetrically with respect to the first plane of symmetry $P_1$ of the connector 8. Only a first lateral flank 13 is shown in FIG. 2, the second lateral flank being formed in the symmetrical part of the base 9 with respect to the first plane of symmetry $P_2$ of the connector 8. Each of these lateral flanks 13 is substantially flat, with a small thickness in the transverse direction, and the distance between the external faces of these two lateral flanks 13 represents the dimension, in the transverse direction, of the body 10 of the connector 8. Therefore, the first and second lateral flanks 13 delimit an internal volume of the connector 8 between one another. Towards the longitudinal ends of the body 10, the first and second lateral flanks 13 are connected together by a set of ribs 14a, 14b, which act notably as reinforcements for the body 10. More particularly, the connector 8 has a pair of external ribs 14a and a pair of internal ribs 14b. The external ribs 14a for the one part and the internal ribs 14b for the other part are formed symmetrically with respect to a transverse median plane of the connector, this median plane being parallel to the second plane of symmetry $P_2$. Thus, from one longitudinal end of the connector 8 to the other longitudinal end of the connector 8, the connector 8 comprises a first external rib 14a, a first internal rib 14b, a second internal rib 14b and a second external rib 14a.

As FIG. 2 shows, each of the first and second lateral flanks 13 essentially has, as seen from the side, a profile such that the upper surface of each of these lateral flanks 13 forms, in its central part in the longitudinal direction of the connector 8, a slope that descends in the direction of each of the longitudinal ends thereof. This shape makes it possible both to lighten the connector 8 and to make it easier to join it to a cover according to the invention, the description of which is yet to come, or to the driving arm 2.

Formed through each of the first and second lateral flanks 13 is a receiving bearing 15 for receiving a shaft 2a secured to the driving arm 2 of the wiping system 3. The connector 8 is intended to be connected to the arm 2a during a first step in a joining method according to the invention, which is described below.

A first receiving bearing 15 is thus formed in the first lateral flank 13, and a second receiving bearing can be formed in the second lateral flank. Each of the receiving bearings 15 has a substantially cylindrical shape and is a through-bearing, that is to say it extends transversely through the entire thickness of each of the lateral flanks 13. The inside diameter of each of the receiving bearings 15 is defined with respect to a mean diameter of the shaft 2a that is secured to the driving arm 2 to which the connector 8 is intended to be connected. The centres of the two receiving hearings 15 that are arranged in the first lateral flank 13 and the second lateral flank, respectively, are aligned along the transverse axis Y parallel to the direction of the axis Oy of the orthonormal frame of reference defined above. The transverse axis Y embodies the rotation axis of the wiper 1 with respect to the driving anti 2, once the shaft 2a is accommodated inside the receiving bearings 15 of the connector 8.

Each of the receiving bearings 15 is positioned substantially in the central zone of the corresponding lateral flank, in the longitudinal direction. According to the embodiment illustrated in the figures, the transverse axis Y along which the centres of these receiving bearings 15 are aligned is thus comprised within the second, transverse vertical, plane of symmetry $P_2$ of the connector 8. In the vertical direction, each of the receiving bearings 15 advantageously extends substantially in the central zone of the body 10 of the connector 8. Each of these receiving bearings 15 is thus arranged on one or the other of the first or second lateral flank 13 such that, for the one part, material of the corresponding lateral flank 13 remains above the receiving bearing 15, and such that, for the other part, material of the corresponding lateral flank 13 remains below said receiving bearing 15, between its lowest point and the upper face of the base 9 of the connector 8.

In order to allow the shaft 2a that is secured to the driving arm 2 to be accommodated and held in the connector 8, that is to say, for example, simultaneously in the receiving bearings 15 that are arranged in the first and the second lateral flank 13, respectively, an inlet opening 16 is formed in line with each of these receiving bearings 15, above the latter. The longitudinal dimension of each of the inlet openings 16 is less than the inside diameter of the receiving bearing 15 to which the inlet opening 16 provides access and into which the inlet opening 16 leads. In other words, each inlet opening 16 forms an access cone to the corresponding receiving bearing 15. A first inlet opening 16 thus forms an access cone to the first receiving bearing 15 arranged in the first lateral flank 13, and a second inlet opening forms an access cone to the second receiving bearing arranged in the second lateral flank. Thus, when the shaft 2a secured to a driving arm 2 of the wiping system 3 is accommodated simultaneously in the receiving bearings 15, said shaft 2a is then held therein in the vertical direction Oz. In order to make it easier to insert the shaft 2a into the inlet openings 16 and to fit this shaft 2a in the receiving bearings 15, chamfers 17 are formed on each of the inlet edges bordering each of the inlet openings 16. The smallest longitudinal dimension of the inlet opening 16 is strictly less than the diameter of the shaft 2a.

The body 10 of the connector 8 also has, within the internal volume delimited by the first and second lateral flanks 13, a guide plate 18 which extends substantially longitudinally and vertically from the upper face of the base 9. According to the embodiment illustrated in the figures, the guide plate 18 is positioned, in the transverse direction, substantially in the median part of the internal volume delimited by the two lateral flanks 13. It thus extends in this case substantially along the first, longitudinal vertical, plane of symmetry $P_1$ of the connector 8.

The guide plate 18 is also advantageously positioned substantially centrally in the longitudinal direction of the connector 8. Advantageously, the profile of the upper surface of the guide plate 18 is substantially similar to that of at least one of the first and/or second lateral flanks 13. According to a preferred embodiment of the invention, the dimension of the guide plate 18 in the vertical direction is less than that of each of the lateral flanks 13, measured in their central part along the longitudinal axis Ox, however.

A guide notch 19 is formed in the upper part of the guide plate 18 substantially in the central part in the longitudinal direction. This guide notch 19 leads onto the upper surface of the guide plate 18. More specifically, the guide notch 19 is designed such that it substantially forms, in its lower part, a half-cylinder which is centred on the transverse axis Y and the diameter of which is greater than that of said receiving bearings 15. According to the embodiment illustrated in the figures, this half-cylindrical part extends vertically towards the upper surface of the guide plate 18 over a longitudinal dimension substantially equal to its diameter. According to other, alternative embodiments, the guide notch 19 may flare slightly in the direction of the upper surface of the guide plate 18.

FIG. 3 shows a cover 20, the function of which is to lock the connector 8 to the driving arm 2 and protect it thereon, and thus to participate in the pivot connection which takes place between the wiper and the driving arm. The cover 20 extends lengthwise along a longitudinal axis X which, when the cover 20 is fitted on the wiper, is parallel to the main axis of the wiper 1.

The cover 20 comprises a shroud 21 formed by a top 22 bordered by two lateral flanges 23. The lateral flanges 23 are formed in a manner parallel to one another and parallel to the longitudinal axis X and extend substantially within a third plane of symmetry $P_3$. The top 22 for its part extends within a plane orthogonal to the third plane of symmetry $P_3$ and to a fourth plane of symmetry $P_4$. In a section made in the fourth plane of symmetry $P_4$, the shroud 21 is in the shape of a "U", the base of which is formed by the top 22 and the legs of which are formed by the lateral flanges 23. The shroud 21 delimits an internal volume 24 between the top 22 and the lateral flanges 23, said internal volume 24 housing at least two longitudinal flanks 25 that are parallel to one another and substantially parallel to the lateral flanges 23. A distance measured in a transverse direction separates each longitudinal flank 25. Another distance measured in this transverse direction separates a lateral flange 23 from the longitudinal flank which is adjacent thereto. This other distance forms a space 32 which is intended to receive an end part of the driving arm, notably an end part of which the section forms a "U".

The longitudinal flanks 25 are secured to an internal face of the top 22 and to a flap 26. The flap 26 extends within the internal volume 24, being secured to a transverse wall 27 which is formed from one of the lateral flanges 23 to the other. This transverse wall 27 thus forms a longitudinal end wall of the cover 20. The flap 26 is formed in a plane which is substantially orthogonal to the third plane of symmetry $P_3$ and to the fourth plane of symmetry $P_4$. Each longitudinal flank 25 is terminated by a vertical edge 28 which is disposed away from the transverse wall 27, with respect to the longitudinal flank 25.

Each vertical edge 28 extends generally parallel to the vertical axis Z. Each longitudinal flank 25 is provided with an open slot 29 which extends along the longitudinal axis X of the cover. The open slot is provided to receive the shaft 2a of the driving arm 2. This slot 29 is in the form of a cutout formed in the longitudinal flank in question. It is an open slot in that it opens towards the environment outside the cover 20.

The open slot 29 is rectilinear and extends for example orthogonally to the vertical edge 28. The rectilinear nature of the slot is recognizable in that this slot has an oblong shape and extends in a single linear direction. This open slot 29 is thus delimited at a first longitudinal end by an opening 29c and at a second longitudinal end by an end wall 29e. The latter is formed by an edge of the longitudinal flank 25 which delimits the open slot 29.

In a more detailed manner, the open slot 29 comprises a first portion 29a which is in the shape of a parallelogram and a second portion 29b, adjacent to the first portion 29a, which is in the shape of a semicircle. The first portion 29a is terminated by the opening 29c which is formed at the vertical edge 28. The first portion 29a and the second portion 29b are formed in line with one another, one having a rectangular shape while the other has a semicircular shape. These arrangements are such that, by way of a rectilinear movement in translation, the shaft 2a is able to be fitted easily into the open slot 29. The rectilinear movement takes place successively by crossing the opening 29c, passing through the first portion 29a so as to reach the second portion 29b in which the shaft 2a is intended to be at least partially accommodated, in abutment against the end wall 29e.

The cover 20, notably the flap 26, is provided with a tab 30 which extends in line with the flap 26 and the end of which is equipped with a transverse lip 31. Such a transverse lip 31 forms a tooth that is intended to engage with an edge of the connector. The tab 30 has a flat shape and a thickness, measured along the vertical axis Z, which gives it a degree of flexibility. In other words, the tab 30 tilts on the flap 26. The transverse lip 31 has a thickness, measured along the vertical axis Z, which is greater than that of the tab 30. In other words, the transverse lip 31 protrudes above the tab 30, that is to say towards the internal volume 24.

In FIG. 4, which shows the cover 20 joined to the connector 8, the shaft 2a being left out so as to make the figure more easily readable, the open slot 29 and the transverse lip 31 form a means 29, 31 for fastening the cover 20 to a device made up of the shaft 2a and the connector 8. The transverse lip 31 is engaged with one of the ribs 14a formed on the connector 8, advantageously one of the two internal ribs. It will furthermore be noted that the cover 20 can be installed at one or the other of the longitudinal ends of the connector 8, the transverse lip 31 engaging with the corresponding rib 14a.

The fastening means is part of a locking means for locking the wiper 1 to the driving arm 2 by implementation of the joining method of the present invention which comprises a plurality of successive steps. The wiper is fastened to the shaft driving arm 2a in a pivoting manner by the engagement of the shaft 2a in the receiving bearing(s) 15 formed in the connector 8.

A first step in the joining method consists in joining the connector 8 and the shaft 2a of the driving arm 2 together, by fitting the shaft 2a into the receiving bearings 15, and advantageously into the guiding notch 19 of the connector 8. At this stage, the pivoting connection between the wiper and the driving arm is complete.

A second step in the joining method consists in positioning the shaft 2a inside the open slot(s) 29. In other words, the cover 20 is moved towards the connector 8 and the open slots 29 are fitted on the shaft 2a by carrying out a movement in translation along the longitudinal axis X of the cover 20.

A third step in the joining method consists in continuing the movement in translation of the cover 20 on the connector 8 until the transverse lip 31 engages with an internal face of the external rib 14a of the connector 8. Once in abutment, the cover 20 immobilizes an assembly 2a, 8, 20 formed by the shaft 2a, the connector 8 and the cover 20.

The invention claimed is:

1. A cover for locking a driving arm to a connector that carries a wiper,
   wherein the connector is configured to be fitted with a shaft that is configured to be secured to the driving arm,
   the cover comprising: at least two longitudinal flanks, the cover extending along a main longitudinal axis of the wiper,
   wherein each of the at least two longitudinal flanks has an open slot delimited at a first longitudinal end by an end wall and at a second longitudinal end by an opening for receiving the shaft,
   wherein said opening for receiving the shaft is formed opposite said end wall,
   wherein each of the open slots is rectilinear and extends in a linear direction from the first longitudinal end to the second longitudinal end,
   wherein each of the open slots includes a straight section at the second longitudinal end and is terminated at the first longitudinal end by a semi-circular section with a diameter that matches a width of the straight section,
   wherein the cover is a single-piece cover that is configured to lock the connector to the driving arm and to cover the connector and the driving arm,
   wherein the cover further comprises:
      fastening means for fastening the cover to a device formed by the shaft and by the connector, the fastening means comprising the open slot for receiving the shaft and a transverse lip, wherein the transverse lip engages with a rib on the connector;

a transverse wall which is provided with a tab, wherein the tab is provided with the transverse lip which protrudes from the tab.

2. The cover according to claim 1, wherein the periphery of each open slot has a substantially "U"-shaped overall shape.

3. The cover according to claim 1, wherein the open slot of each of the longitudinal flanks comprises a first portion which is in the shape of a parallelogram and a second portion which is in the shape of a semicircle.

4. The cover according to claim 3, wherein the opening for receiving the shaft is formed through an edge delimiting the longitudinal flank.

5. The cover according to claim 1, further comprising a shroud delimiting an internal volume which accommodates the longitudinal flanks.

6. The cover according to claim 5, wherein the shroud comprises a top bordered by two lateral flanges.

7. The cover according to claim 6, wherein at least one space is formed between one of the lateral flanges and one of the longitudinal flanks configured to receive at least a part of the driving arm.

8. The cover according to claim 7, wherein the top extends substantially perpendicularly to the longitudinal flanks.

9. The cover according to claim 7, wherein the transverse wall extends between the lateral flanges.

10. An assembly formed by a connector that carries a wiper, comprising:
the connector provided with at least one receiving bearing for receiving a shaft, the connector being locked to a driving arm that is secured to the shaft by a cover, wherein the connector is configured to be fitted with the shaft; and
the cover comprising at least two longitudinal flanks,
wherein the cover extends along a main longitudinal axis of the wiper,
wherein each longitudinal flank has an open slot delimited at a first longitudinal end by an end wall and at a second longitudinal end by an opening for receiving the shaft,
wherein said opening is formed opposite said end wall,
wherein each of the open slots is rectilinear and extends in a linear direction from the first longitudinal end to the second longitudinal end,
wherein each of the open slots includes a straight section at the second longitudinal end and is terminated at the first longitudinal end by a semi-circular section with a diameter that matches a width of the straight section,
wherein the cover is a single-piece cover that is configured to lock the connector to the driving arm and is configured to cover the connector and the driving arm,
wherein the cover further comprises:
means for fastening the cover to a device formed by the shaft and by the connector, the means for fastening comprising the open slot for receiving the shaft and a transverse lip, wherein the transverse lip engages with a rib on the connector; and
a transverse wall which is provided with a tab, wherein the tab is provided with the transverse lip which protrudes from the tab.

11. A method for joining together the assembly according to claim 10 with the cover, the method comprising:
joining the connector and the shaft of the driving arm together, by fitting the shaft into the at least one receiving bearing;
positioning the shaft inside the open slot in the cover; and
moving the cover in translation with respect to the connector, until the transverse lip of the cover is engaged over the rib of the connector so as to secure the assembly.

12. A wiping system comprising:
a driving arm provided with a shaft; and
a connector that carries a wiper,
wherein the driving arm and the connector are locked and covered by a cover that is a single-piece cover,
wherein the connector is configured to be fitted with the shaft that is secured to the driving arm,
wherein the cover comprises: at least two longitudinal flanks,
wherein the cover extends along a main longitudinal axis of the wiper,
wherein each longitudinal flank has an open slot delimited at a first longitudinal end by an end wall and at a second longitudinal end by an opening for receiving the shaft,
wherein said opening for receiving the shaft is formed opposite said end wall,
wherein each of the open slots is rectilinear and extends in a linear direction from the first longitudinal end to the second longitudinal end,
wherein each of the open slots includes a straight section at the second longitudinal end and is terminated at the first longitudinal end by a semi-circular section with a diameter that matches a width of the straight section,
wherein the cover is a single-piece cover that is configured to lock the connector to the driving arm and that is configured to cover the connector and the driving arm,
wherein the cover further comprises:
means for fastening the cover to a device formed by the shaft and by the connector, the means for fastening comprising the open slot for receiving the shaft and a transverse lip, wherein the transverse lip engages with a rib on the connector, and
a transverse wall which is provided with a tab, wherein the tab is provided with the transverse lip which protrudes from the tab.

\* \* \* \* \*